United States Patent [19]
Giffin, III

[11] Patent Number: 5,345,760
[45] Date of Patent: Sep. 13, 1994

[54] TURBOPROP BOOSTER

[75] Inventor: Rollin G. Giffin, III, Cincinnati, Ohio

[73] Assignee: General Electric Company, Cincinnati, Ohio

[21] Appl. No.: 13,853

[22] Filed: Feb. 5, 1993

[51] Int. Cl.⁵ .............................................. F02K 3/02
[52] U.S. Cl. ................................. 60/226.1; 60/262; 415/193; 415/199.5
[58] Field of Search ............... 60/226.1, 262; 415/193, 415/198.1, 199.5; 416/129

[56] References Cited

U.S. PATENT DOCUMENTS

| | | | |
|---|---|---|---|
| 2,619,795 | 12/1952 | Drake | 60/226.1 |
| 2,947,139 | 8/1960 | Hausmann . | |
| 3,673,802 | 7/1972 | Krebs et al. | 60/226 |
| 3,797,239 | 3/1974 | Hausmann et al. | 60/224 |
| 3,979,903 | 9/1976 | Hull, Jr. et al. | 60/39.09 P |
| 3,987,621 | 10/1976 | Sabatella | 60/226.1 |
| 4,104,876 | 8/1978 | Larsen et al. | 60/226.1 |
| 4,744,214 | 5/1988 | Monsarrat et al. | 60/226.1 |
| 4,790,133 | 12/1988 | Stuart | 60/226.1 |
| 4,860,537 | 8/1989 | Taylor | 60/226.1 |

FOREIGN PATENT DOCUMENTS 2165892 4/1986 United Kingdom ............... 60/226.1

*Primary Examiner*—Richard A. Bertsch
*Assistant Examiner*—William Wicker
*Attorney, Agent, or Firm*—Jerome C. Squillaro; Nathan D. Herkamp

[57] ABSTRACT

A booster-compressor for a high flow coefficient turboprop aircraft engine increases engine thrust by supercharging the air into the inlet of the gas generating core engine. The flow of supercharged air from the booster-compressor is split between the core engine and the ambient to allow for the use of standard size rotor blades and stator blades and to provide supplemental thrust. The rotor blades are designed as impulse rotors and the stator vanes are arranged in an axially converging annular flowpath in order to limit to a minimum any increase in the static pressure of the supercharged air.

10 Claims, 3 Drawing Sheets

TURBOPROP BOOSTER

BACKGROUND OF THE INVENTION

1. Field of the Invention

The present invention relates generally to a booster-compressor for a turboprop aircraft engine and particularly concerns a turboprop booster driven by a propeller hub. The booster is provided with specially designed rotors and stators which maintain a substantially constant static pressure from the booster inlet to the booster outlet.

2. Description of Prior Developments

In order to increase the thrust developed by conventional gas turbine Jet aircraft engines, supercharged air can be driven into the inlet of the core engine, also known as the gas generator, with a booster type compression system. Such a system typically includes several rows of rotor blades and several rows of coacting stator vanes which raise the pressure of the air entering the core engine.

A need has recently been recognized for increasing the thrust produced by existing turboprop engines. A turboprop engine is generally defined as an engine which does not have a duct surrounding its propeller blades as contrasted with a turbofan engine which is typically defined as an engine which includes a duct surrounding its rotating fan blades. Because of the differences in operation and design between gas turbine-driven jet engines and turboprop engines, conventional booster designs suitable for use with gas turbine jet engines do not appear to offer significant improvements in the thrust developed by turboprop engines.

For example, initial studies associated with the development of the present invention applied conventional booster design technology to a turboprop engine. These studies investigated the possibility of driving a turboprop booster on the same hub or spinner used to drive the propeller blades. Unfortunately, the wheel speed of such a booster is constrained by the rotational speed of the propeller or fan and the diameter of the propeller spinner.

Because of these constraints, booster designs of the type used in gas turbine engines would require at least two stages of compression to produce a modest five percent increase in air pressure. Achieving this relatively small pressure boost with two or more additional conventional compression stages has not been viewed as an attractive solution to increasing the thrust of a turboprop engine.

When an existing turboprop engine is to be supercharged, a problem can arise in sizing the rotor blades and stator blades of the booster-compressor if conventional design techniques are applied. That is, the required cross-sectional area of the annulus which defines the flowpath of the supercharged air into the core engine can in some cases be quite small. This can result in the use of large numbers of relatively small, difficult to manufacture, rotor blades and stator vanes.

Accordingly, a need exists for a booster-compressor for supercharging inlet air into the core engine of a turboprop engine using a minimum number of booster stages and a minimum number of blades and vanes. Ideally, a single stage booster having a single row of rotor blades and a single row of stator vanes would produce a significant increase in the pressure of the air introduced into the core engine of a turboprop aircraft engine.

A further need exists for such a turboprop booster which can be designed with a relatively large annular flowpath so as to allow the use of conventional sized rotor blades and stator vanes. Such blade and vane sizing would reduce the number of blades and vanes required and facilitate their manufacture and assembly.

An additional need exists for a booster which provides a greater increase in the pressure of supercharged air entering the core engine of a turboprop engine than that presently available by applying conventional gas turbine engine booster designs to a turboprop engine.

An additional need exits for a booster which can produce a given increase in pressure using the fewest number of compression stages.

SUMMARY OF THE INVENTION

The present invention has been conceived to fulfill the needs noted above and therefore has as an object the provision of a single stage booster-compressor designed for use with a turboprop aircraft engine. By limiting the design to a single stage, the blade count may be minimized thereby reducing the cost and complexity of the booster-compressor.

Another object is to provide such a booster with an annular flowpath having a cross section which allows the use of substantially standard length rotor blades and stator vanes.

Yet another object of the invention is to provide a booster-compressor which splits the flow of supercharged air between the core engine gas generator of a turboprop engine and a booster exit to ambient.

Still another object is to supplement the thrust of a supercharged turboprop engine by directing a portion of supercharged air exiting the booster directly to the ambient.

Another object of the invention is to provide a booster-compressor for a turboprop engine which does not significantly increase the static pressure of the air flowing through the booster-compressor yet which provides a greater increase in the total pressure of the supercharged air entering the core engine than that possible with conventional booster technology.

Briefly, the invention is directed to a booster-compressor which directs only a portion of its supercharged air into the inlet of a core engine gas generator of a turboprop engine. The annular flowpath of the booster-compressor is split into two separate flowstreams. One flowstream enters the core engine while the other exits the booster-compressor through an exhaust nozzle leading directly into the ambient atmosphere.

The flow which directly enters the atmosphere through the booster exit exhaust nozzle provides supplemental thrust while allowing the cross-sectional area of the flowpath of the booster-compressor to be increased over that area which would be required for providing supercharged air only to the core engine. This increase in flowpath section provided by bypassing a portion of the supercharged air to ambient allows the rotor blades and stator vanes of the booster-compressor to be sized for low blade and vane count and for ease of manufacture and assembly.

Without such increase in flowpath area, the blade size required for supercharging some existing turboprop engines would be significantly less than one inch in radial length. Manufacturing, assembling and installing large numbers of such small blades is quite difficult.

The booster-compressor constructed in accordance with the present invention is primarily adapted for use with turboprop engines which operate with relatively high flow coefficients. Such engines generally impart only a small increase in kinetic energy to the air which is driven through the engine. For example, the proposed booster-compressor would operate at a flow coefficient (the ratio of axial velocity to wheel velocity) of two or greater as compared to more common values of flow coefficients that are typically less than unity.

The flow coefficient is generally defined as the ratio of the axial velocity of the air to the wheel speed of the propeller or rotor blade. The present invention is intended to operate with a booster flow coefficient on the order of two because of the low blade speeds produced by a propeller hub. By operating with such a high flow coefficient, the total pressure of the air flowing through the booster may be increased without significantly increasing its static pressure and without the Mach numbers becoming prohibitively large, i.e. well below sonic.

The static pressure is limited to a small increase across the booster-compressor by designing the rotor blades of the booster-compressor in the form of impulse rotors and by decreasing the radial section of the flowpath annulus along the axial length of the stator vanes. This design results in the flowpath annulus at the rear of the stator vanes being smaller than that at the front of the stator vanes as the flowpath converges axially rearwardly.

By significantly limiting any increase in static pressure through the booster-compressor as compared to prior booster designs, the aerodynamic loading of the booster-compressor blade rows is minimized for the higher than normal work coefficient that results. The work coefficient can be thought of as the actual energy imparted to the flow divided by the kinetic energy of the rotor.

Although the static pressure rise is minimal, a total pressure increase of ten percent is achievable in accordance with the invention. This amounts to about four times the total pressure boost presently achievable with conventional booster-compressor designs and yet uses only a single stage of compression as compared to conventional designs which typically would require four compression stages.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENTS

Figure 1:
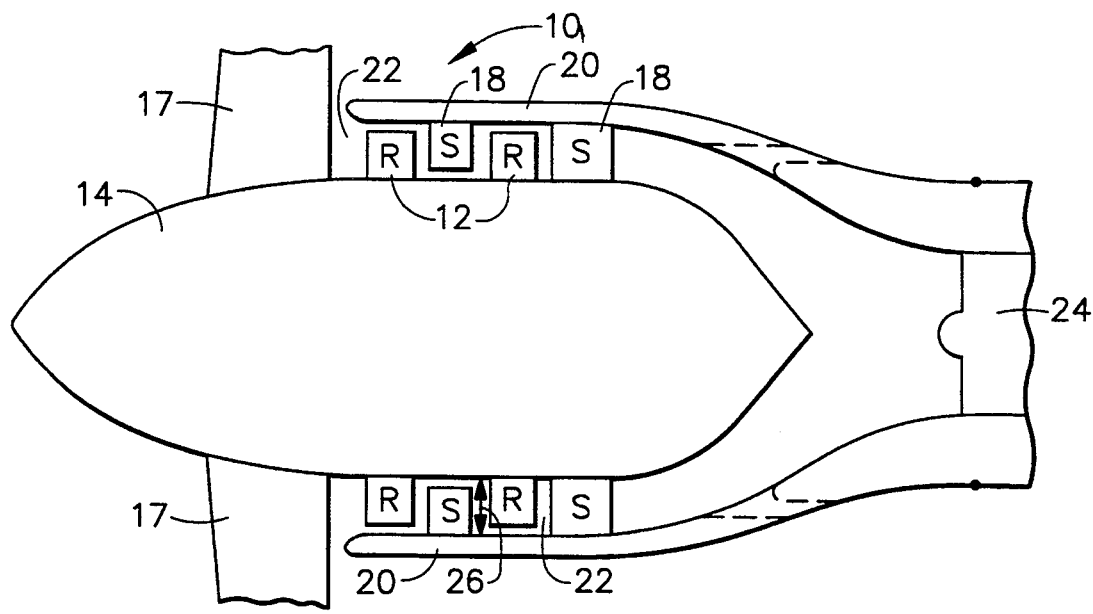
FIG. 1 is a partial schematic view in axial section showing a turboprop booster designed according to an initial embodiment of the invention.

As seen in FIG. 1, a booster-compressor 10 constructed in accordance with an initial design of the invention includes two rows of rotor blades 12 mounted to the propeller hub or wheel hub 14 of a turboprop aircraft engine 16. The rotor blades 12 are driven by the same shaft that drives propellers 17. This mounting and driving arrangement of the booster-compressor rotor blades on the same shaft, spinner or hub that drives the propellers 17 is a significant feature of the invention.

Two rows of stator vanes 18 are staggered adjacent the rotor blades so as to provide two separate stages of compression. The stator vanes 18 are mounted to an annular shroud 20 which defines the outer diameter of an annular booster flowpath 22 within which air is compressed for supercharging core engine 24.

The outer surface of propeller hub 14 defines the inner radial boundary of flowpath 22. The radial height 26 of flowpath 22 is relatively small due to the air-charging requirements of core engine 24. Although this design can theoretically provide a 4% to 5% boost in air pressure entering the core engine 24, the multiple stage compressor design and the small-sized blades and vanes present drawbacks which compromise the advantages of this design.

Figure 2:
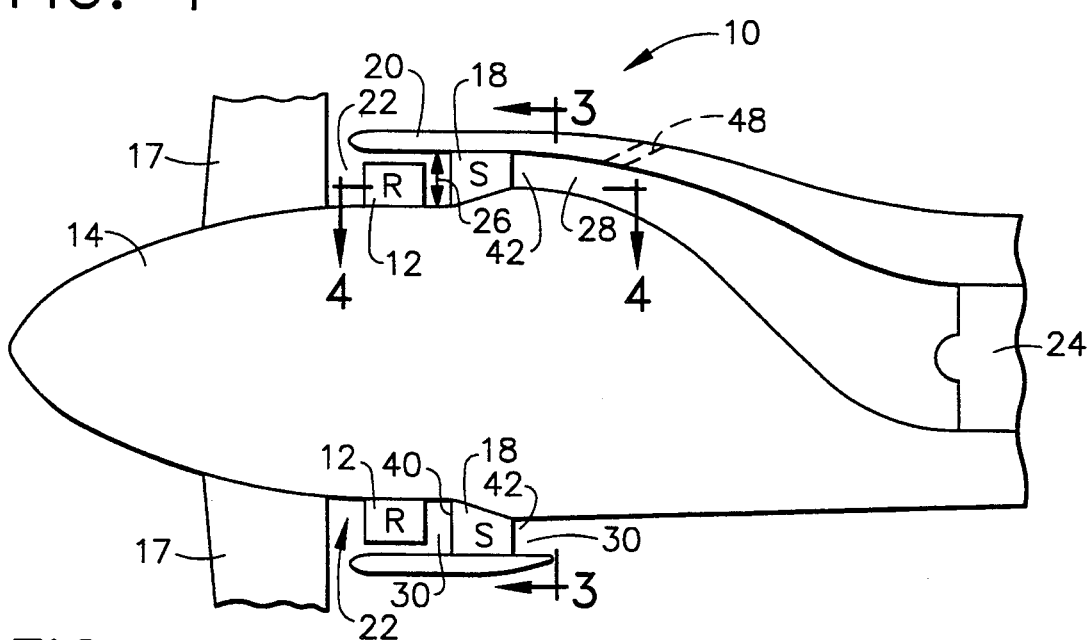
FIG. 2 is a partial schematic view in axial section showing a turboprop booster designed according to an improved embodiment of the invention.
Figure 3:
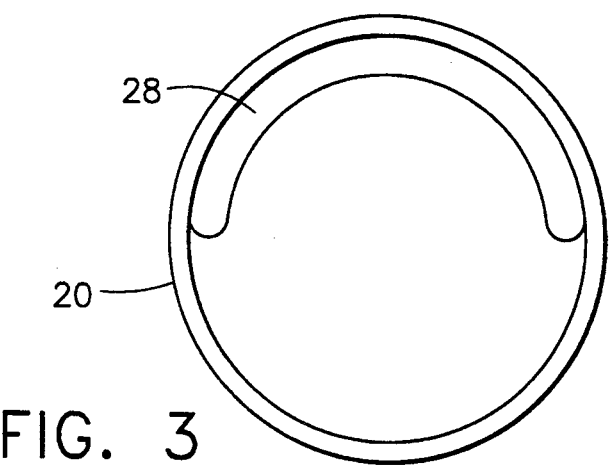
FIG. 3 is a view in radial section taken along section 3—3 of FIG. 2.
Figure 4:
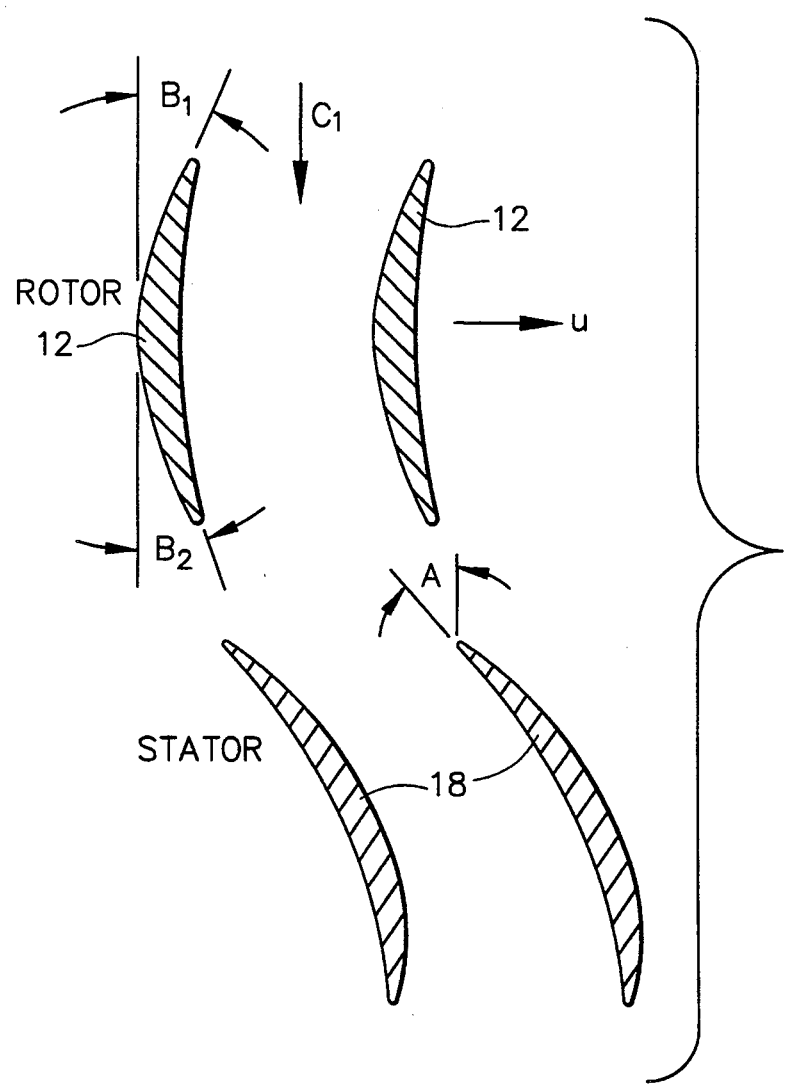
FIG. 4 is a sectional view taken along section 4—4 of FIG. 2 showing the arrangement of impulse rotors and stator blades.

By modifying the booster-compressor 10 of FIG. 1, as shown in FIGS. 2, 3 and 4, only one row of rotor blades 12 and only one row of stator blades 18 are required to provide adequate supercharging of core engine 24. In fact, in one comparison, the booster-compressor of FIG. 2 can provide twice the pressure rise in the air entering the core engine than possible with the design of FIG. 1, notwithstanding the elimination of one row of rotor blades and one row of stator vanes, i.e. the pressure rise per stage is enhanced four-fold by the booster modifications detailed below.

As seen in FIGS. 2 and 3, the booster flowpath 22 splits into a core engine flowpath 28 and a thrust-producing flowpath 30. The amount of air flowing into flowpath 22 is typically several times the amount actually required by the core engine. Flowpath 30 allows more than half of the total airflow from booster flowpath 22 to bypass the core engine 24. In the examples shown in FIGS. 2 and 3, about two-thirds of the air bypasses the core engine via flowpath 30.

This flowpath splitting arrangement permits the sizing of flowpath 22 to virtually any desired radial height 26 so as to accommodate virtually any desired size of rotor blade or stator vane within flowpath 22. More particularly, given the airflow requirements of the gas generating core engine 24 and a desired blade height, the relative cross-sectional areas of flowpaths 28 and 30 may be easily adjusted to meet these requirements.

Thus, excess air above that required for supercharging the core engine 24 is allowed to enter flowpath 22. This is accomplished by oversizing the radial cross section of flowpath 22 to allow for larger rotor blades, while bypassing the excess supercharged air through flowpath 30. This arrangement allows just the correct amount of supercharged air to enter core engine 24.

Contrary to conventional booster designs which increase the static pressure of the supercharged air, the present invention does not require any increase in the static pressure of the air as it flows through the booster-compressor. This realization is particularly applicable to those booster-compressors which are designed with a relatively high flow coefficient, i.e. on the order of two.

The goal of the invention is to prevent any significant increase in the static pressure of the air flowing through the booster while increasing the total pressure of the supercharged air with a single rotating row of rotor blades. Because of the low wheel speed and high flow coefficient associated with this design, this goal is achievable without creating any large increases in the through flow air velocity. Accordingly, high Mach number problems are avoided on the blades and, in particular, the vanes.

In order to raise the total pressure of the supercharged air with little or no increase in its static pressure, a specially designed row of rotor blades is provided in the form as shown in FIG. 4. Each rotor blade 12 is in the form of an impulse rotor. Although the design of impulse rotors is well known, the adaptation and use of an impulse rotor in a booster-compressor is considered new.

An impulse rotor prevents any static pressure increase by maintaining its inlet angle $B_1$ equal to its outlet angle $B_2$ and by maintaining a constant area flowpath annulus along the axial extent of the rotor. A combination of other exit angles with suitable annulus areas also can accomplish the desired effect of little or no static pressure change.

The cross sectional area of flowpath 22 as it extends axially along the rotor blades is held constant. By limiting velocity and pressure differentials across the row of stator blades, the aerodynamic loading of the blades is correspondingly limited. This facilitates blade design without aerodynamically overloading the blades and vanes.

The direction of the rotation of the propeller spinner or wheel hub 14 upon which the rotor blades are mounted is represented in FIG. 4 by the directional arrow or vector u. The direction of pure axial flow through the rotor blades is represented by the directional arrow or vector $C_1$. Once the air passes through the rotor blades, it is received by a row of specially configured stator blades 18 as further seen in FIG. 4.

The static pressure across the stator blades 18 is maintained substantially constant by decreasing the cross-sectional area of the annular flowpath 22 as shown in FIG. 2. Without converging the flowpath annulus in this manner, an undesirable rise in the static pressure of the air flowing across the stator vanes would result. This in turn would undesirably increase the aerodynamic loading of the stator vanes.

Air entering the stator vanes at 40 converges as it flows axially across the stator vanes and exits the booster-compressor at 42. Air exiting the stator vanes has been straightened or deswirled so as to exit in a substantially axial direction and thereby provide supplemental thrust. Without the stator vanes 18, no meaningful or useful thrust would be produced by that portion of the supercharged air exiting the booster to the ambient through flowpath 30.

In one particular embodiment wherein a booster-compressor designed according to the present invention i.e. to be incorporated within an existing turboprop engine, the wheel speed of the booster-compressor i.e. constrained by the existing rotational speed of the propeller 17 and the preset diameter of the propeller spinner 14 to a speed of about 230 feet per second. At this rotational speed, a flight speed of about 300 knots or about equal to a Mach number of about 0.5 is realized. This speed is approximately equal to the speed of the air entering the flowpath 22 during cruise speed.

Figure 5:
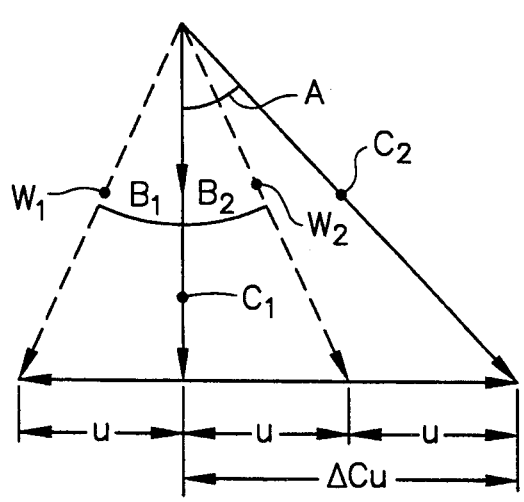
FIG. 5 is a vector diagram of one example of the flow through the turboprop booster of FIG. 2.

Using the rotor and stator configuration shown in FIG. 4 with a wheel speed of 230 feet per second and a flight Mach number of 0.5 or about 525 feet per second, the absolute and relative velocities of the airflow through the booster-compressor can be represented by the vector diagram of FIG. 5. In FIG. 5, u represents the wheel speed of 230 feet per second and $C_1$ represents the absolute velocity of the air entering the rotor blades of the booster-compressor in a pure axial direction.

Thus, $C_1$ is equal to the flight speed of about 525 feet per second. As seen in FIG. 4, the direction of rotation of the rotor blades is perpendicular to the direction of flight. Since the rotors are designed as impulse rotors, angle $B_1$ equals angle $B_2$.

This particular case is well suited for supercharging in accordance with the present invention since the flow coefficient of $C_1/u$ is relatively high, i.e. on the order of two. As noted above, the booster-compressor of the present invention is most effective with those turboprop engines which operate at a relatively low wheel or hub speed as compared to the cruising speed of the aircraft and the corresponding axial airflow speed through the booster-compressor.

As further seen in FIG. 5, $C_2$ represents the absolute velocity of the air leaving the impulse rotor blades and entering the stator blades. $W_1$ and $W_2$ represent the respective relative velocities of air entering and leaving the rotor. Angles $B_1$ and $B_2$ represent the inlet and exit angles of the impulse rotor blades. In the example of FIG. 5, $B_1$ and $B_2$ each equal about $23\frac{1}{2}$ degrees for a total turning angle equal to about 47 degrees. Angle A represents the inlet angle of the stator vanes which in this case equals 41 degrees.

The values of angles A and B are determined from the values of u, delta Cu and $C_1$ as shown in FIG. 5. For example, angle A is chosen to be equal to the angle whose tangent is equal to (delta Cu)/$C_1$. In FIG. 5, this value is equal to $2u/C_1$. Angle B is chosen to be equal to the angle whose tangent is equal to $u/C_1$. Thus, angle $A = TAN^{-1} 2u/C_1$ and angle $B = TAN^{-1} u/C_1$.

Because the hub spinner speed, i.e. the wheel speed u as well as the flight speed $C_1$ can obviously vary from one engine design to the next, the values of angles A, $B_1$ and $B_2$ may likewise vary to suit the particular operating parameters of a specific turboprop engine design. For example, if the wheel speed varies ±20% from the aforementioned value of 230 feet per second, and if the flight speed likewise varies ±20% from the aforementioned value of 525 feet per second, the following values of A, $B_1$ and $B_2$ would apply to the design of the impulse rotors and stator vanes according to the invention:

EXAMPLE 1 (Nominal)

u = 230 Ft/Sec
$C_1$ = 525 Ft/Sec
$A = TAN^{-1} 2 (230 \text{ Ft/Sec})/(525 \text{ Ft/Sec}) = 41.2°$
$B_1 = B_2 = TAN^{-1} (230 \text{ Ft/Sec})/(525 \text{ Ft/Sec}) = 23.6°$

EXAMPLE 2

20% increase in u and 20% decrease in $C_1$
$u = 276$ Ft/Sec
$C_1 = 430$ Ft/Sec
$A = TAN^{-1} 2\ (276\ Ft/Sec)/(430\ Ft/Sec) = 51.6°$
$B_1 = B_2 = TAN^{-1}\ (276\ Ft/Sec)/(430\ Ft/Sec) = 32.2°$

EXAMPLE 3

20% decrease in u and 20% increase in $C_1$
$u = 194$ Ft/Sec
$C_1 = 630$ Ft/Sec
$A = TAN^{-1} 2\ (194\ Ft/Sec)/(630\ Ft/Sec) = 31.4°$
$B_1 = B_2 = TAN^{-1}\ (194\ Ft/Sec)/(630\ Ft/Sec) = 16.9°$ Thus, for the 20% variations in wheel speed and flight speed, the values of $B_1$ and $B_2$ could vary from 32.2° to 16.9° and the values of A could vary from 51.6° to 31.4°. Thus, the invention may be practiced over a varying range of rotor blade and stator vane inlet and exit angles. The specific values chosen for these angles will depend on the particular turboprop engine operating parameters. The dynamic head or dynamic load existing within the booster, i.e. $\tfrac{1}{2}pC_1^2$ could also vary by as much as ±20% for any given booster design where p is the density of the air and $C^1$ is its through flow velocity.

Based on these operating parameters, an air pressure boost of about 10% is achieved with an increase in velocity of only about 33% and a negligible increase in static pressure. Limiting the velocity of air entering the core engine is desirable insofar as the aerodynamic loading of the stator vanes and core engine inlet diffuser is correspondingly reduced.

By returning the flow to near axial with the stator blades 18, a net cruise thrust of 5.4 pounds per pound of flow results. The stator vanes must be included to achieve this thrust enhancement. As configured, the booster-compressor will be subjected to two separate back pressures around the circumference of exit 30, i.e. the nozzle exit, and core engine inlet.

The booster-compressor could, of course, be separated from the engine inlet. A fixed exit area nozzle is shown. A variable area exit or exhaust port could be employed if operating line control is necessary. For example, the area of foreign object ejection port 48 (FIG. 2) could be varied or other suitable arrangements such as a variable trailing flap on shroud 20 could be provided.

Figure 6:
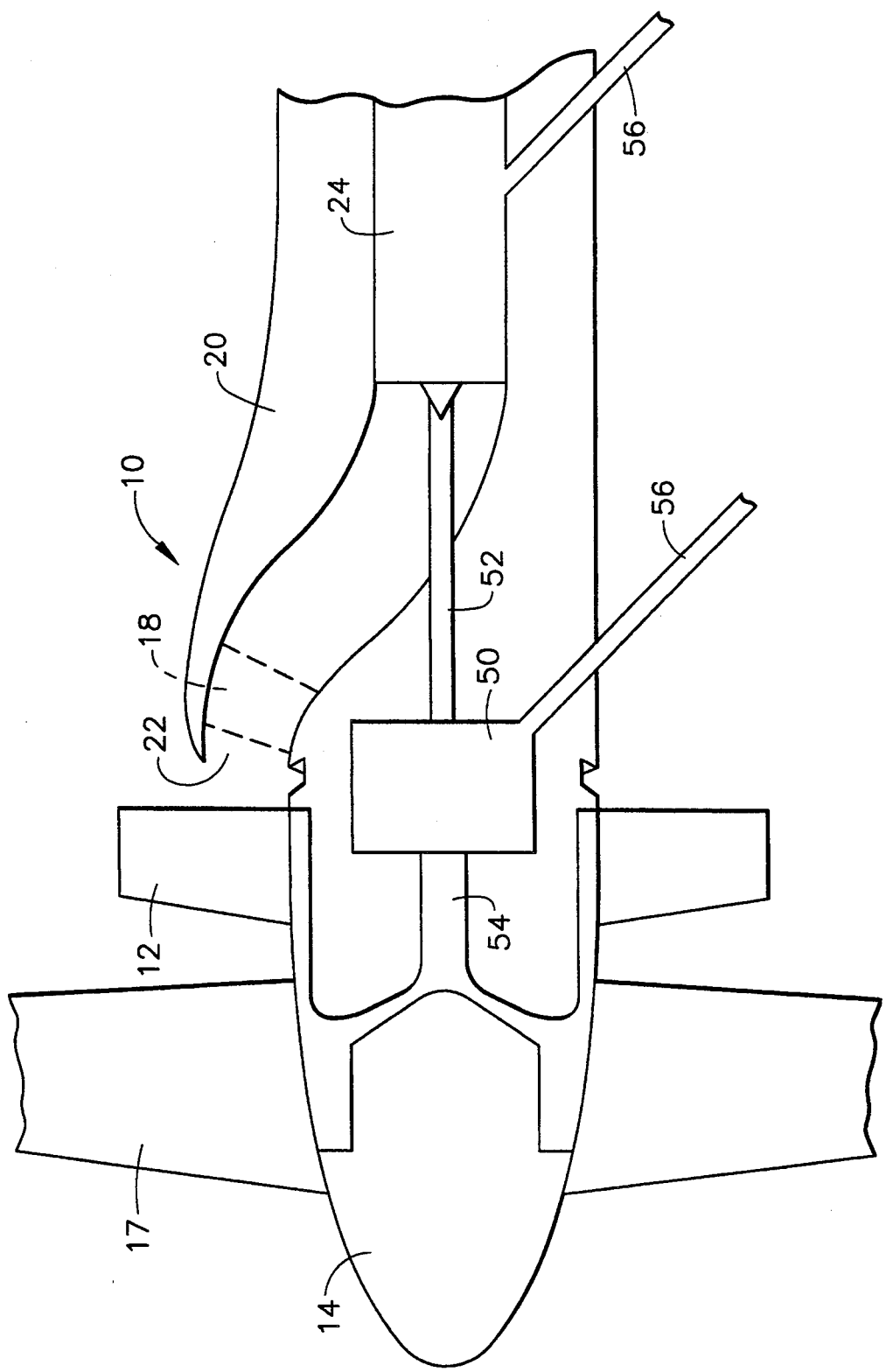
FIG. 6 is a partial schematic view in axial section of an alternate embodiment of the present invention adapted for use with an unducted booster rotor.

A variation of the invention is illustrated in FIG. 6 wherein a row of unducted booster rotor blades 12 is shown mounted to the rotating propeller spinner or hub 14. These rotor blades are mounted axially forward of and on the exterior of semi-circular shroud 20. An interconnection between the gas generator or core engine 24 and gear box 50 is shown in the form of a high speed rotating input shaft 52.

A low speed output shaft 54 interconnects the gear box 50 with hub 14 to drive the propeller 17 at an appropriate rotational speed. Frame members 56 are schematically depicted for mounting the booster-compressor 10 to the frame of an aircraft.

The booster-compressor of FIG. 6 operates in essentially the same manner and is designed in essentially the same way as that previously described except for the fact that the booster rotors 12 do not extend within the shroud 20.

There has been disclosed heretofore the best embodiment of the invention presently contemplated. However, it is to be understood that various changes and modifications may be made thereto without departing from the spirit of the invention.

What is claimed is:

1. A booster-compressor for supercharging air into a core engine of a turboprop aircraft engine comprising:
    a row of rotor blades comprising a row of sub-sonic impulse rotors, said row of impulse rotors causing the static pressure of said air at an inlet of said row of impulse rotors to be substantially equal to the static pressure of said air at an outlet of said row of impulse rotors throughout the operating range of said turboprop aircraft engine:
    a row of stator vanes; and
    a shroud surrounding said impulse rotors and said stator vanes, wherein said shroud defines in part an axially-extending flowpath for directing said air into said core engine;
    wherein said flowpath defines an axially-converging flowpath along said stator vanes which causes the static pressure of said air at an inlet of said row of stator vanes to be substantially equal to the static pressure of said air at an exit of said row of stator vanes throughout the operating range of said turboprop aircraft engine;
    wherein said flowpath maintains a constant cross sectional area along said rotor blades;
    wherein each of said impulse rotors includes an inlet angle and an exit angle, said inlet angle being equal to said exit angle.

2. The booster-compressor of claim 1, wherein said row of stator vanes is axially adjacent to and axially aft of said row of impulse rotors.

3. A booster-compressor for supercharging air into a core engine of a turboprop aircraft engine, comprising:
    a row of rotor blades comprising a row of sub-sonic impulse rotors, said row of impulse rotors causing the static pressure of said air at an inlet of said row of impulse rotors to be substantially equal to the static pressure of said air at an outlet of said row of impulse rotors throughout the operating range of said turboprop aircraft engine;
    a row of stator vanes; and
    a shroud surrounding said impulse rotors and said stator vanes, wherein said shroud defines in part an axially-extending flowpath for directing said air into said core engine;
    wherein said flowpath defines an axially-converging flowpath along said stator vanes which causes the static pressure of said air at an inlet of said row of stator vanes to be substantially equal to the static pressure of said air at an exit of said row of stator vanes throughout the operating range of said turboprop aircraft engine;
    wherein said flowpath maintains a constant cross sectional area along said rotor blades;
    wherein said row of stator vanes is axially adjacent to and axially aft of said row of impulse rotors;
    said booster-compressor further comprising a propeller hub and a propeller driven by said hub and wherein said impulse rotors are mounted to said hub, said impulse rotors being axially adjacent to said propeller.

4. The booster-compressor of claim 3, wherein said aircraft engine operates with a flow coefficient on the order of two.

5. A booster-compressor for supercharging air into a core engine of a turboprop aircraft engine, comprising:
- a hub rotatably driven by said core engine;
- a propeller driven by said hub;
- a row of rotor blades driven by said hub; and
- a row of stator vanes cooperating with said rotor blades to direct supercharged air into said core engine, said row of stator vanes being axially adjacent to and axially aft of said row of rotor blades, wherein said stator vanes discharge a portion of said supercharged air to ambient, said portion of said air bypassing said core engine;
- wherein said rotor blades are unducted and are disposed axially between said propeller and said row of stator vanes.

6. The booster-compressor of claim 5, wherein said row of rotor blades comprises a row of sub-sonic impulse rotors.

7. A booster-compressor for supercharging air into a gas generator, comprising:
- a hub;
- a shroud surrounding said hub and defining a first flowpath;
- a row of rotor blades disposed in said first flowpath;
- a row of stator vanes disposed in said first flowpath, said row of stator vanes being axially adjacent to and axially aft of said row of rotor blades;
- a second flowpath communicating with said first flowpath and with said gas generator; and
- a third flowpath communicating with said first flowpath and bypassing said gas generator;
- wherein a first portion of said air flowing through said row of stator vanes discharges into said second flowpath and a second portion of said air flowing through said row of stator vanes discharges into said third flowpath;
- wherein said second and third flowpaths each comprise an annular flowpath extending over an arc of less than 360°.

8. The booster-compressor of claim 7, wherein said stator vanes are arranged such that air exiting said third flowpath produces axially-directed supplemental thrust.

9. The booster-compressor of claim 7, wherein said first flowpath has a cross sectional area greater than said second flowpath.

10. The booster-compressor of claim 9, wherein:
- said stator vanes are mounted to said shroud;
- said rotor blades are mounted to said hub; and
- said shroud surrounds said rotor blades.

* * * * *